US012425701B2

United States Patent
Su et al.

(10) Patent No.: US 12,425,701 B2
(45) Date of Patent: Sep. 23, 2025

(54) VIDEO SYNTHESIS METHOD AND APPARATUS, ELECTRONIC DEVICE, AND STORAGE MEDIUM

(71) Applicant: Huawei Technologies Co., Ltd., Shenzhen (CN)

(72) Inventors: Da Su, Shenzhen (CN); Yundie Zhang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 226 days.

(21) Appl. No.: 18/002,791

(22) PCT Filed: Apr. 12, 2021

(86) PCT No.: PCT/CN2021/086707
§ 371 (c)(1),
(2) Date: Dec. 21, 2022

(87) PCT Pub. No.: WO2021/258814
PCT Pub. Date: Dec. 30, 2021

(65) Prior Publication Data
US 2023/0254550 A1    Aug. 10, 2023

(30) Foreign Application Priority Data
Jun. 24, 2020    (CN) .................. 202010595765.X

(51) Int. Cl.
G06V 20/40    (2022.01)
G06V 10/74    (2022.01)
(Continued)

(52) U.S. Cl.
CPC ......... *H04N 21/816* (2013.01); *G06V 10/761* (2022.01); *G06V 20/41* (2022.01);
(Continued)

(58) Field of Classification Search
CPC ................................................ G06F 3/048–05
See application file for complete search history.

(56) References Cited

U.S. PATENT DOCUMENTS

| | | | |
|---|---|---|---|
| 8,006,186 B2* | 8/2011 | Kellock | G11B 27/34 |
| | | | 715/728 |
| 10,003,737 B2* | 6/2018 | Ishida | H04N 23/6811 |

(Continued)

FOREIGN PATENT DOCUMENTS

| | | |
|---|---|---|
| CN | 105118081 A | 12/2015 |
| CN | 106373170 A | 2/2017 |

*Primary Examiner* — Daniel Rodriguez
(74) *Attorney, Agent, or Firm* — Conley Rose, P.C.

(57) ABSTRACT

A video synthesis method includes obtaining materials, video synthesis policy selection information, a video template, and configuration information of the video template, where the video template includes at least one segment, and the configuration information includes scenario matching information of each segment, performing scenario analysis on the materials specified by a user to obtain scenario characteristic information, determining a video synthesis policy based on the video synthesis policy selection information, if the video synthesis policy is a fixed-length synthesis policy, performing scenario matching on each material and each segment based on the scenario characteristic information of each of the materials and the scenario matching information of each segment in the video template, selecting content obtained through scenario matching in each material, and filling the content in a corresponding segment in the video template to synthesize a video.

20 Claims, 14 Drawing Sheets

(51) Int. Cl.
  *G10H 1/40* (2006.01)
  *G11B 27/10* (2006.01)
  *H04N 21/234* (2011.01)
  *H04N 21/81* (2011.01)

(52) U.S. Cl.
  CPC ............. *G06V 20/46* (2022.01); *G06V 20/48* (2022.01); *G06V 20/49* (2022.01); *G10H 1/40* (2013.01); *G11B 27/10* (2013.01); *H04N 21/23424* (2013.01); *G10H 2210/021* (2013.01); *G10H 2210/076* (2013.01)

(56) References Cited

U.S. PATENT DOCUMENTS

| | | | |
|---|---|---|---|
| 2002/0012521 A1* | 1/2002 | Nagasaka | G06F 16/7857 707/E17.028 |
| 2007/0263798 A1* | 11/2007 | Dewing | H04L 65/1094 379/88.13 |
| 2009/0054092 A1* | 2/2009 | Stonefield | G06Q 30/0601 705/26.1 |
| 2010/0153520 A1* | 6/2010 | Daun | G11B 27/034 709/218 |
| 2012/0095817 A1* | 4/2012 | Kamil | G11B 27/031 715/202 |
| 2012/0284625 A1* | 11/2012 | Kalish | G11B 27/034 715/723 |
| 2013/0272679 A1* | 10/2013 | Cavalcanti | G11B 27/034 386/282 |
| 2017/0062006 A1* | 3/2017 | Plom | G11B 27/031 |
| 2017/0091973 A1* | 3/2017 | Lee | G06F 3/04845 |
| 2017/0352083 A1* | 12/2017 | Ruck | G06Q 10/1093 |
| 2018/0040349 A1* | 2/2018 | Xie | G11B 27/036 |
| 2018/0330756 A1* | 11/2018 | MacDonald | G06F 16/951 |
| 2020/0152237 A1* | 5/2020 | Chen | G11B 27/034 |
| 2020/0154060 A1* | 5/2020 | Kovshov | H04N 5/262 |
| 2020/0273494 A1* | 8/2020 | Mee | G11B 27/031 |
| 2022/0188352 A1* | 6/2022 | Wu | G06F 16/739 |
| 2022/0392493 A1* | 12/2022 | Pi | G06V 30/41 |
| 2023/0195285 A1* | 6/2023 | Feng | G11B 27/031 715/723 |

* cited by examiner

| BPM: b Unit length: x = 60/b | Start time | End time | From Element | To Element | Special effect | Characteristic | FromElementSrc | From-Segment | ToElementSrc | To-Segment |
|---|---|---|---|---|---|---|---|---|---|---|
| Segment 1 | T0 = 0 | T1 = 4x | Material 1 | N/A | Original-speed playback | No subject | /sdcard/DCIM/... | 00:00.000 – 00:03.000 | | |
| Transition 1 | T1 = 4x | T2 = 5x | Material 1 | Material 2 | Fade in and fade out | No subject | /sdcard/DCIM/... | 00:03.000 – 00:03.400 | /sdcard/DCIM /... | 00:00.000 – 00:00.400 |
| Segment 2 | T2 = 5x | T3 = 7x | Material 2 | N/A | Original-speed playback | Subject in the middle | /sdcard/DCIM/... | 00:00.400 – 00:02.000 | | |
| Transition 2 | T3 = 7x | T4 = 8x | Material 2 | Material 3 | ... | ... | | | | |
| ... | | | | | | | | | | |

FIG. 7

VIDEO SYNTHESIS METHOD AND APPARATUS, ELECTRONIC DEVICE, AND STORAGE MEDIUM

CROSS-REFERENCE TO RELATED APPLICATIONS

This is a U.S. National Stage of International Patent Application No. PCT/CN2021/086707 filed on Apr. 12, 2021, which claims priority to Chinese Patent Application No. 202010595765.X filed on Jun. 24, 2020. Both of the aforementioned applications are hereby incorporated by reference in their entireties.

TECHNICAL FIELD

This application relates to the field of video processing technologies, and in particular, to a video synthesis method and apparatus, an electronic device, and a storage medium.

BACKGROUND

Currently, in the background of popularity of short videos, a user of a terminal (for example, a mobile phone) has an increasing demand for quickly editing and generating a video.

Short video production usually requires operations such as splicing, filtering, special effect adding, and background music adding on materials. In the conventional technology, a video is usually generated in the following two manners. One manner is that a user manually performs operations such as splicing, filtering, special effect adding, and background music adding on materials. However, this manner relies too much on manual editing, resulting in a low degree of automation and low convenience. The other manner is that the user quickly generates the video by selecting a material source file and selecting a customized template. In some cases, background analysis may also be used to automatically help the user select suitable materials and match a template to generate the short video. However, this manner is inflexible by fixing the template, and problems such as out of synchronization between background music and a video segment, and a fixed length of the generated video easily occur.

Therefore, in the conventional technology, a video generation solution in which manual editing does not need to be performed and flexibility is considered is urgently required.

SUMMARY

Embodiments of this application provide a video synthesis method and apparatus, an electronic device, a storage medium, and a computer program product, so that a video can be quickly generated, manual editing does not need to be performed by a user, and flexibility is considered.

According to a first aspect, an embodiment of this application provides a video synthesis method. The method includes:

obtaining materials specified by a user, video synthesis policy selection information, a video template, and configuration information of the video template, where a type of the material specified by the user includes a picture material and/or a video material, the video template includes at least one segment, and the configuration information of the video template includes scenario matching information of each of the at least one segment;

performing scenario analysis on the materials specified by the user, to obtain scenario characteristic information of each of the materials; and determining a video synthesis policy of the user based on the video synthesis policy selection information, and if the video synthesis policy is a fixed-length synthesis policy, performing scenario matching on each material and each segment in the video template based on the scenario characteristic information of each of the materials and the scenario matching information of each segment in the video template, and selecting content obtained through scenario matching in each material and filling the content in a corresponding segment in the video template, to synthesize a video.

With reference to the first aspect, in a feasible implementation, the method further includes:

if the video synthesis policy is a variable-length synthesis policy, predicting first duration based on the materials specified by the user;

if the first duration is greater than total duration of the video template, selecting at least one segment in the video template and adding the at least one segment to the video template, so that a difference between total duration of an adjusted video template and the first duration is not greater than duration of a longest segment in the video template;

if the first duration is less than total duration of the video template, deleting at least one segment in the video template, so that a difference between total duration of an adjusted video template and the first duration is not greater than duration of a longest segment in the video template; and performing scenario matching on each material and each segment in the adjusted video template based on the scenario characteristic information of each of the materials and scenario matching information of each segment in the adjusted video template, and selecting content obtained through scenario matching in each material and filling the content in a corresponding segment in the adjusted video template, to synthesize a video.

With reference to the first aspect, in a feasible implementation, the method further includes:

obtaining background music specified by the user;

performing beat detection on the background music specified by the user to obtain a beat speed of the background music specified by the user;

adjusting duration of at least one segment in the video template based on the beat speed of the background music, so that duration of all segments in the video template is an integer multiple of the beat speed; and then performing the step of "determining a video synthesis policy of the user based on the video synthesis policy selection information".

With reference to the first aspect, in a feasible implementation, before the performing scenario matching on each material and each segment in the video template based on the scenario characteristic information of each of the materials and the scenario matching information of each segment in the video template, the method further includes:

determining a quantity of materials specified by the user;

determining whether the quantity of materials specified by the user is greater than a quantity of segments in the video template; and if the quantity of materials specified by the user is greater than the quantity of segments in the video template, splitting at least one segment in the video template, so that the quantity of segments in the video template is equal to the quantity of materials specified by the user.

According to a second aspect, an embodiment of this application provides a video synthesis apparatus. The apparatus includes:

a first obtaining module, configured to obtain materials specified by a user, video synthesis policy selection information, a video template, and configuration information of the video template, where a type of the material specified by the user includes a picture material and/or a video material, the video template includes at least one segment, and the configuration information of the video template includes scenario matching information of each of the at least one segment;

a first analysis module, configured to perform scenario analysis on the materials specified by the user, to obtain scenario characteristic information of each of the materials; and a first synthesis module, configured to: determine a video synthesis policy of the user based on the video synthesis policy selection information, and if the video synthesis policy is a fixed-length synthesis policy, perform scenario matching on each material and each segment in the video template based on the scenario characteristic information of each of the materials and the scenario matching information of each segment in the video template, and select content obtained through scenario matching in each material and fill the content in a corresponding segment in the video template, to synthesize a video.

With reference to the second aspect, in a feasible implementation, the apparatus further includes a first prediction module, a first adjustment module, a second adjustment module, and a second synthesis module.

The first prediction module is configured to: if the video synthesis policy is a variable-length synthesis policy, predict first duration based on the materials specified by the user.

The first adjustment module is configured to: if the first duration is greater than total duration of the video template, select at least one segment in the video template and add the at least one segment to the video template, so that a difference between total duration of an adjusted video template and the first duration is not greater than duration of a longest segment in the video template.

The second adjustment module is configured to: if the first duration is less than total duration of the video template, delete at least one segment in the video template, so that a difference between total duration of an adjusted video template and the first duration is not greater than duration of a longest segment in the video template.

The second synthesis module is configured to: perform scenario matching on each material and each segment in the adjusted video template based on the scenario characteristic information of each of the materials and scenario matching information of each segment in the adjusted video template, and select content obtained through scenario matching in each material and fill the content in a corresponding segment in the adjusted video template, to synthesize a video.

With reference to the second aspect, in a feasible implementation, the apparatus further includes a second obtaining module, a first detection module, and a third adjustment module.

The second obtaining module is configured to obtain background music specified by the user.

The first detection module is configured to perform beat detection on the background music specified by the user to obtain a beat speed of the background music specified by the user.

The third adjustment module is configured to adjust duration of at least one segment in the video template based on the beat speed of the background music, so that duration of all segments in the video template is an integer multiple of the beat speed.

With reference to the second aspect, in a feasible implementation, the apparatus further includes a first determining module, a first judging module, and a first splitting module.

The first determining module is configured to determine a quantity of materials specified by the user.

The first judging module is configured to determine whether the quantity of materials specified by the user is greater than a quantity of segments in the video template.

The first splitting module is configured to: if the quantity of materials specified by the user is greater than the quantity of segments in the video template, split at least one segment in the video template, so that the quantity of segments in the video template is equal to the quantity of materials specified by the user.

According to a third aspect, an embodiment of this application provides an electronic device. The electronic device includes a memory, a processor, a touch sensor, and a display. The memory stores a computer program, the processor is connected to the memory, and the processor executes the computer program to implement instructions of the method according to any one of the first aspect or the possible implementations of the first aspect.

According to a fourth aspect, an embodiment of this application provides a computer-readable storage medium, including computer instructions. When the computer instructions are run on an electronic device, the electronic device is enabled to execute instructions of the method according to any one of the first aspect or the possible implementations of the first aspect.

According to a fifth aspect, an embodiment of this application provides a computer program software. When the computer program product runs on a computer, the computer is enabled to execute instructions of the method according to any one of the first aspect or the possible implementations of the first aspect.

It may be understood that the video synthesis solution provided in embodiments of this application is used to perform, based on the video template specified by the user, video synthesis on the materials selected by the user. In a synthesis process, the user does not need to perform manual editing, and the video template of the user may be dynamically adjusted, to implement synchronization between a music beat and a video segment and flexibly set a video length. Compared with the conventional technology, in the video synthesis method provided in embodiments of this application, manual editing does not need to be performed, and video synthesis flexibility can be considered while it is ensured that the video template is used.

BRIEF DESCRIPTION OF DRAWINGS

FIG. 7 is a schematic diagram of configuration information of a video template in a video synthesis method according to an embodiment of the present invention;

DESCRIPTION OF EMBODIMENTS

For better understanding of technical solutions of the present invention, the following describes embodiments of this application in detail with reference to accompanying drawings.

It should be clear that the described embodiments are merely some rather than all of embodiments of the present invention. All other embodiments obtained by a person of ordinary skill in the art based on embodiments of the present invention without creative efforts shall fall within the protection scope of the present invention.

In this application, "at least one" means one or more, and "a plurality of" means two or more. A term "and/or" describes an association relationship between associated objects and indicates that three relationships may exist. For example, A and/or B may indicate the following cases: Only A exists, both A and B exist, and only B exists, where A and B may be singular or plural. A character "/" generally indicates an "or" relationship between associated objects. At least one of the following items (pieces) or a similar expression thereof refers to any combination of these items, including any combination of singular items (pieces) or plural items (pieces). For example, at least one item (piece) of a, b, or c may indicate a, b, c, a and b, a and c, b and c, or a, b, and c, where a, b, and c may be singular or plural.

Figure 1:
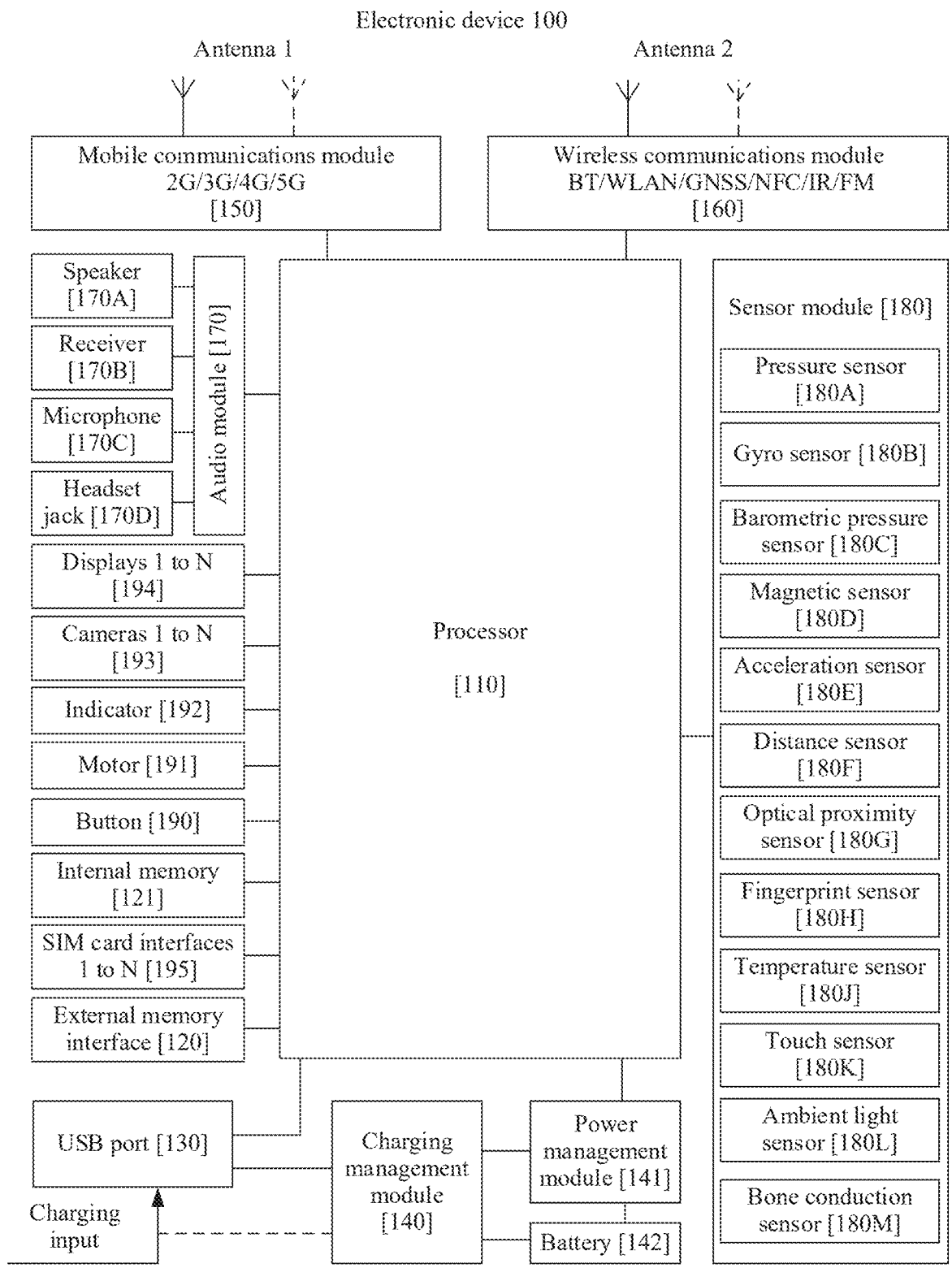
FIG. 1 is a schematic diagram of a structure of an electronic device according to an embodiment of this application.

FIG. 1 is a schematic diagram of a structure of an electronic device 100.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) port, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be used to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be used for audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as the I2C interface, the I2S interface, the UART interface, the MIPI interface, or the like.

The USB port 130 is a port that conforms to a USB standard specification, and may be specifically a mini USB port, a micro USB port, a USB Type-C port, or the like. The USB port 130 may be configured to connect to a charger to charge the electronic device 100, or may be configured to perform data transmission between the electronic device 100 and a peripheral device. The USB port 130 may alternatively be configured to connect to a headset, to play an audio through the headset. The port may alternatively be configured to connect to another electronic device such as an AR device.

It may be understood that an interface connection relationship between the modules shown in this embodiment of the present invention is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger, or a wired charger. In some embodiments of wired charging, the charging management module 140 may receive a charging input of the wired charger through the USB port 130. In some embodiments of wireless charging, the charging management module 140 may receive a wireless charging input by using a wireless charging coil of the electronic device 100. The charging management module 140 supplies power to the electronic device by using the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, the display 194, the camera 193, the wireless communications module 160, and the like. The power management module 141 may be further configured to monitor parameters such as a battery capacity, a battery cycle count, and a battery health status (electricity leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antennas may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave by using the antenna 1 for radiation. In some embodiments, at least some functional modules of the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate the received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent device. In some other embodiments, the modem processor may be independent of the processor 110, and is disposed in a same device as the mobile communications module 150 or another functional module.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave by using the antenna 2 for radiation.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLO-NASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 may implement a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is opened, and light is transferred to a photosensitive element of the camera through a lens. An optical signal is converted into an electrical signal, and the photosensitive element of the camera transfers the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto a photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to processing the digital image signal. For example, when the electronic device 100 selects a frequency, the digital signal processor is configured to perform Fourier transform on frequency energy, and the like.

The video codec is configured to: compress or decompress a digital video. The electronic device 100 may support one or more types of video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, with reference to a transfer mode between human brain neurons, and may further continuously perform self-learning. Applications such as intelligent cognition of the electronic device 100 may be implemented by using the NPU, for example, image recognition, facial recognition, speech recognition, and text understanding.

The external memory interface 120 may be used to connect to an external storage card, for example, a Micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound play function and an image play function), and the like. The data storage area may store data (for example, audio data and an address book) and the like created during use of the electronic device 100. In addition, the internal memory 121 may include a high-speed random access memory, and may further include a nonvolatile memory, for example, at least one magnetic disk storage device, a flash memory device, a universal flash storage (universal flash storage, UFS), and the like. The processor 110 runs the instructions stored in the internal memory 121, and/or the instructions stored in the memory disposed in the processor, to perform various function applications of the electronic device 100 and data processing.

The electronic device 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to: code and decode an audio signal. In some embodiments, the audio module 170 may be disposed in the processor 110, or some functional modules in the audio module 170 are disposed in the processor 110.

The speaker 170A, also referred to as a "horn", is configured to convert an audio electrical signal into a sound signal. The electronic device 100 may listen to music or answer a hands-free call by using the speaker 170A.

The receiver 170B, also referred to as an "earpiece", is configured to convert the audio electrical signal into the sound signal. When a call is answered or voice information is received by using the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through the mouth of the user, to input the sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, reduce noise, further identify a sound source, implement a directional recording function, and the like.

The headset jack 170D is configured to connect to a wired headset. The headset jack 170D may be the USB port 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages application icon, an instruction for viewing an SMS message is executed. When a touch operation whose touch operation intensity is greater than or equal to the first pressure threshold is performed on the Messages application icon, an instruction for creating a new SMS message is performed.

The gyro sensor 180B may be configured to determine a motion posture of the electronic device 100. In some embodiments, an angular velocity of the electronic device 100 around three axes (namely, axes x, y, and z) may be determined by using the gyro sensor 180B. The gyro sensor 180B may be configured to implement image stabilization during photographing. For example, when a shutter is pressed, the gyro sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyro sensor 180B may be further used in navigation and motion sensing game scenarios.

The barometric pressure sensor 180C is configured to measure barometric pressure. In some embodiments, the electronic device 100 calculates an altitude by using a value of the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D, and further set, based on a detected opening or closing state of the flip cover, a feature such as automatic unlocking of the flip cover.

The acceleration sensor 180E may detect accelerations in various directions (usually on three axes) of the electronic device 100, and may detect magnitude and a direction of gravity when the electronic device 100 is static. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure a distance in an infrared manner or a laser manner. In some embodiments, in a photographing scenario, the electronic device 100 may measure a distance through the distance sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor nearby the temperature sensor 180J, to reduce power consumption to implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen. The touch sensor 180K is configured to detect a touch operation performed on or near the touch sensor 180K. The touch sensor may transfer the detected touch operation to the application processor to determine a type of a touch event. A visual output related to the touch operation may be provided by using the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in a headset, to form a bone conduction headset. The audio module 170 may parse out a voice signal based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt, or may be configured to provide a touch vibration feedback. For example, touch operations performed on different applications (for example photographing and audio play) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may further be customized.

The indicator 192 may be an indicator lamp, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external storage card. The electronic device 100 interacts with a network through the SIM card, to implement functions such as calling and data communication. In some embodiments, the electronic device 100 uses an eSIM, that is, an embedded SIM card. The eSIM card may be embedded in the electronic device 100, and cannot be separated from the electronic device 100.

A software system of the electronic device 100 may use a layered architecture, an event-driven architecture, a micro-kernel architecture, a micro service architecture, or a cloud architecture. In embodiments of the present invention, an Android system of a layered architecture is used as an example to describe a software structure of the electronic device 100.

Figure 2:
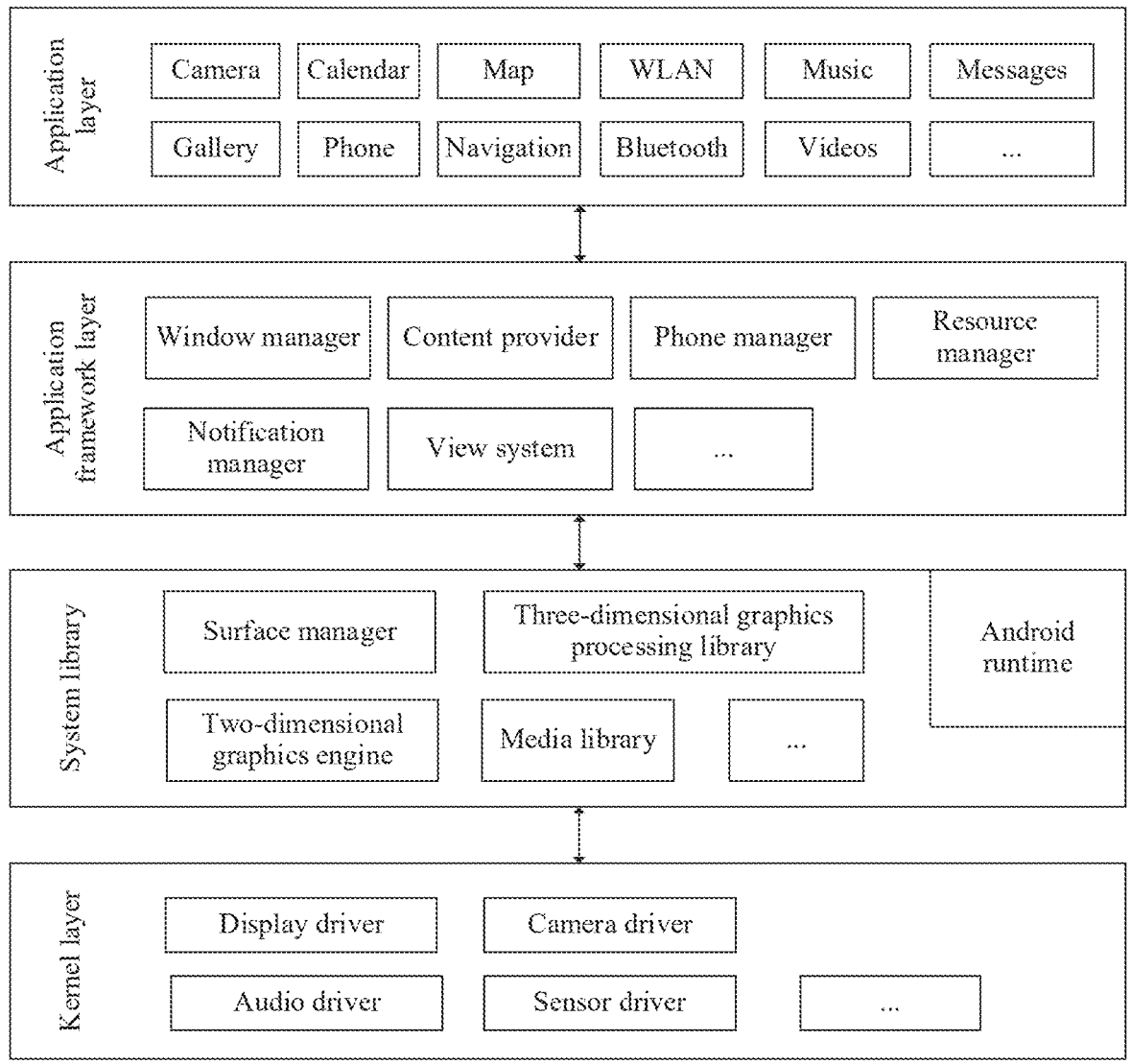
FIG. 2 is a block diagram of a software structure of an electronic device according to an embodiment of the present invention.

FIG. 2 is a block diagram of a software structure of an electronic device 100 according to an embodiment of this application.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

In this embodiment of this application, the application framework layer may further include an activity manager AMS that is configured to manage an activity and that is responsible for work such as startup, switching, and scheduling of each component in the system, and management and scheduling of the application programs.

For example, after it is detected that the mobile phone enters a home screen editing mode, a first application may invoke the activity manager to set a mode of two windows. One window may be configured to display a real-time thumbnail of the home screen, and the other window is configured to display a related control that can be used by the user to edit the home screen, for example, a wallpaper selection control, a home screen gadget adding control, a switching effect selection control, and a control for enabling or disabling a related function. The window manager draws a corresponding interface of each window based on the mode of the two windows set by the activity manager.

The content provider is configured to: store and obtain data, and enable the data to be accessed by an application. The data may include a video, an image, an audio, calls that are made and answered, a browsing history and bookmarks, an address book, and the like.

The view system includes visualized controls such as a control for displaying text and a control for displaying an image. The view system may be configured to construct an application. A display interface may include one or more views. For example, a display interface including a Messages notification icon may include a text display view and an image display view.

The phone manager is configured to provide a communication function of the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application running on the background, or may be a notification that appears on the display in a form of a dialog window. For example, text information is displayed in the status bar, an alert sound is played, the electronic device vibrates, or an indicator lamp blinks.

The Android runtime includes a core library and a virtual machine. The Android runtime is responsible for scheduling and management of the Android system.

The core library includes two parts: a performance function that needs to be invoked by Java language, and an Android core library.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording of audio and videos in a plurality of commonly used formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working process of software and hardware of the electronic device 100 with reference to a capture photographing scenario.

All technical solutions in the following embodiments may be implemented on the electronic device 100 that has the foregoing hardware architecture and software architecture.

A video synthesis method provided in embodiments of this application is applied to an electronic device, and is used to perform, based on a video template specified by a user, video synthesis on materials selected by the user. In a synthesis process, the user does not need to perform manual editing, and the video template of the user may be dynamically adjusted, to implement synchronization between a music beat and a video segment and flexibly set a video length. Compared with the conventional technology, in the video synthesis method provided in embodiments of this application, manual editing does not need to be performed, and video synthesis flexibility can be considered while it is ensured that the video template is used.

The electronic device may be the electronic device 100 shown in FIG. 1. The electronic device 100 may include but is not limited to various types of portable/wearable mobile terminals such as a smartphone, a tablet computer, a personal digital assistant (PDA, Personal Digital Assistant), a smart band, and a smart watch, or may be various types of computer devices such as a notebook computer, a desktop computer, and an all-in-one machine.

Figure 3:
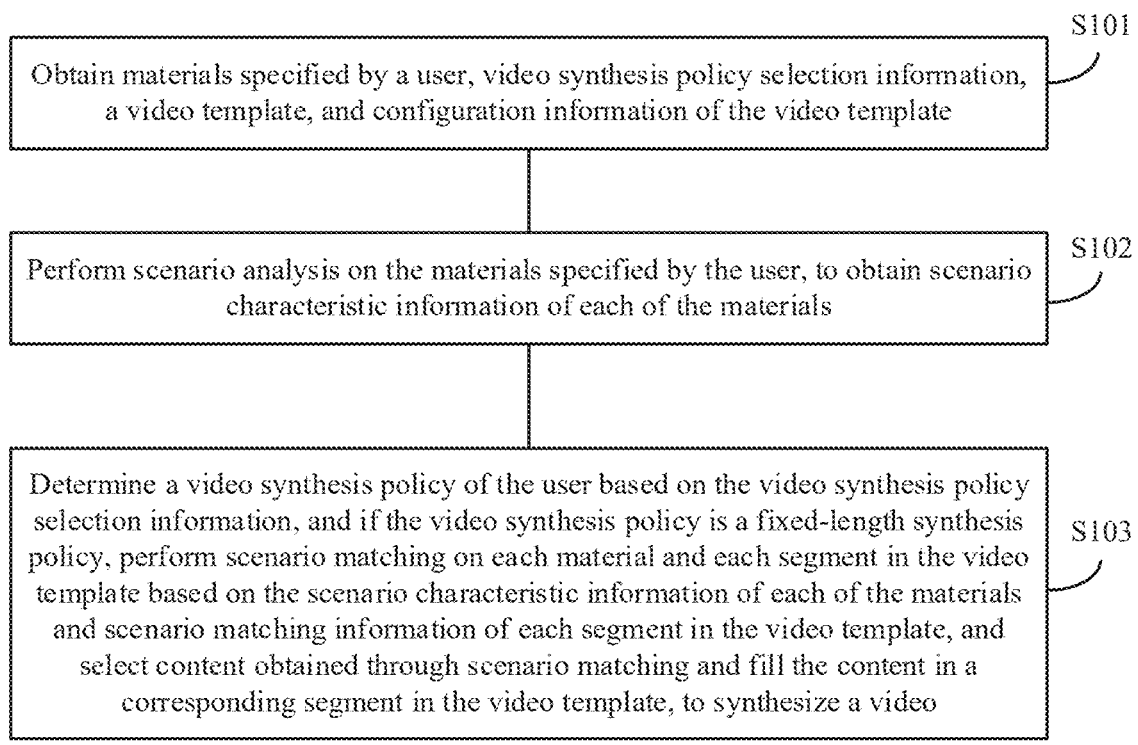
FIG. 3 is a flowchart of a video synthesis method according to an embodiment of this application.

FIG. 3 is a flowchart of a video synthesis method according to an embodiment of this application.

Step S101: Obtain materials specified by a user, video synthesis policy selection information, a video template, and configuration information of the video template, where a type of the material specified by the user includes a picture material and/or a video material, the video template includes at least one segment, and the configuration information of the video template includes scenario matching information of each of the at least one segment.

Step S102: Perform scenario analysis on the materials specified by the user, to obtain scenario characteristic information of each of the materials.

Step S103: Determine a video synthesis policy of the user based on the video synthesis policy selection information, and if the video synthesis policy is a fixed-length synthesis policy, perform scenario matching on each material and each segment in the video template based on the scenario characteristic information of each of the materials and the scenario matching information of each segment in the video template, and select content obtained through scenario matching in each material and fill the content in a corresponding segment in the video template, to synthesize a video.

In this embodiment, whether a length of a video expected to be synthesized is equal to a length of the video template is determined according to the video synthesis policy selected by the user, so that the user can flexibly select the length of the synthesized video. A moving feeling brought by the video template is ensured by analyzing a scenario of a material to match a suitable segment in the video template.

The following describes in detail a specific technical solution of the video synthesis method provided in embodiments of this specification.

Step S101: Obtain materials specified by a user, video synthesis policy selection information, a video template, and configuration information of the video template, where a type of the material includes a picture material and/or a video material, the video template includes at least one segment, and the configuration information of the video template includes scenario matching information of each of the at least one segment.

Figure 4:
FIG. 4 is a diagram of an interface related to a video synthesis method according to an embodiment of the present invention.
Figure 5:
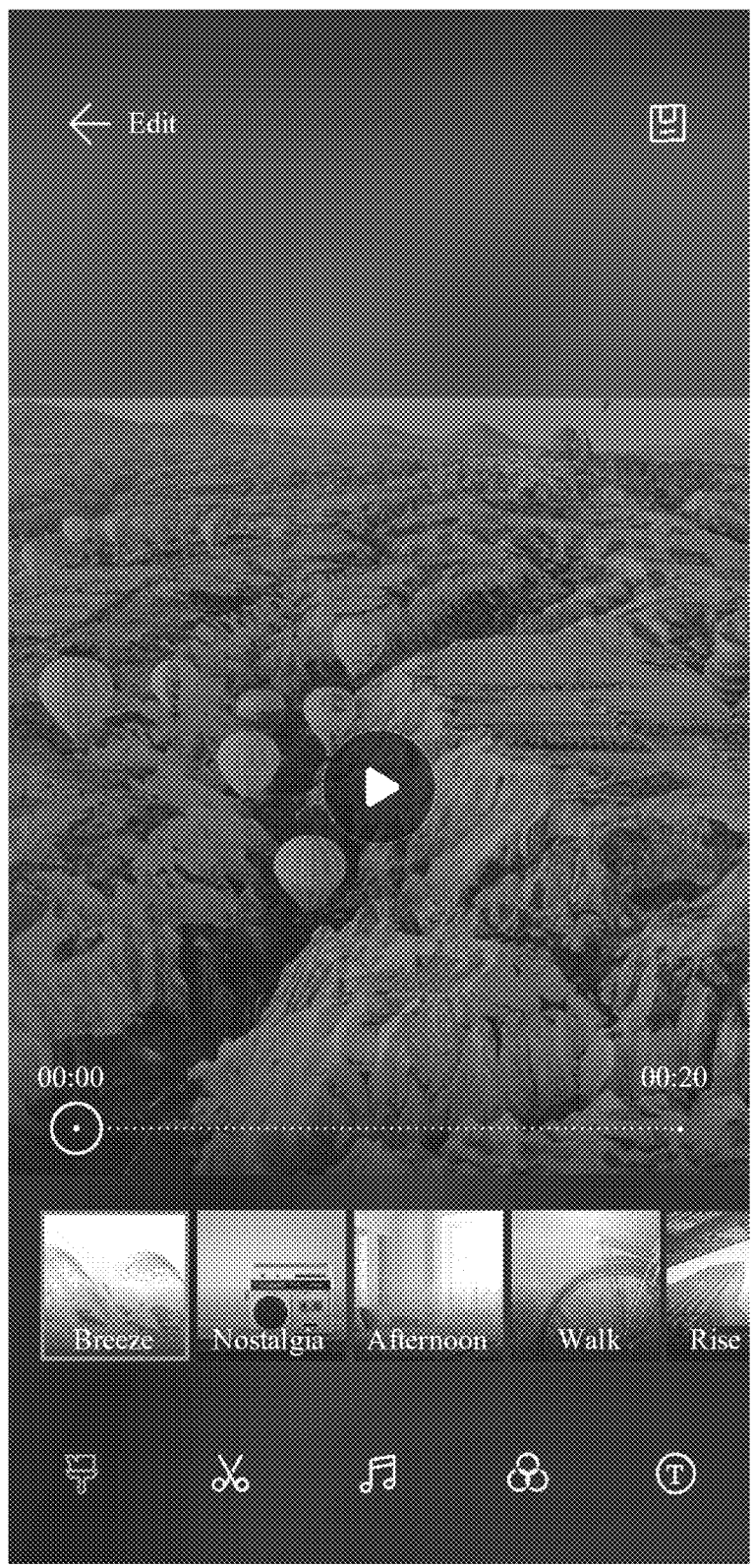
FIG. 5 is a diagram of an interface related to a video synthesis method according to an embodiment of the present invention.

FIG. 4 and FIG. 5 each are a diagram of an interface related to a video synthesis method according to an embodiment of the present invention.

An electronic device can obtain, in response to an operation performed by a user on a user interface of the electronic device, materials specified by the user, video synthesis policy selection information, a video template, and configuration information of the video template. In specific implementation, as shown in FIG. 4, when the user needs to perform video synthesis, the user may select materials through an interface shown in FIG. 4. The material may be a video or a picture stored in the electronic device, or a video or a picture obtained by the user from a network side. As shown in FIG. 5, before or after the user selects the materials, the user may select a video template through an interface shown in FIG. 5. For example, the user selects a video template corresponding to "Breeze". After the user selects a video template, the electronic device obtains configuration information corresponding to the video template. If the user does not select a video template, the user may use a default video template as a video template of the specified materials.

Before or after the materials are specified by the user, the electronic device may request the user to select a video synthesis policy. For example, controls of "fixed length" and "variable length" are displayed on a screen of the electronic device, so that the user selects the video synthesis policy. In this embodiment of the present invention, the video synthesis policy includes a fixed-length synthesis policy and a variable-length synthesis policy.

Figure 6:
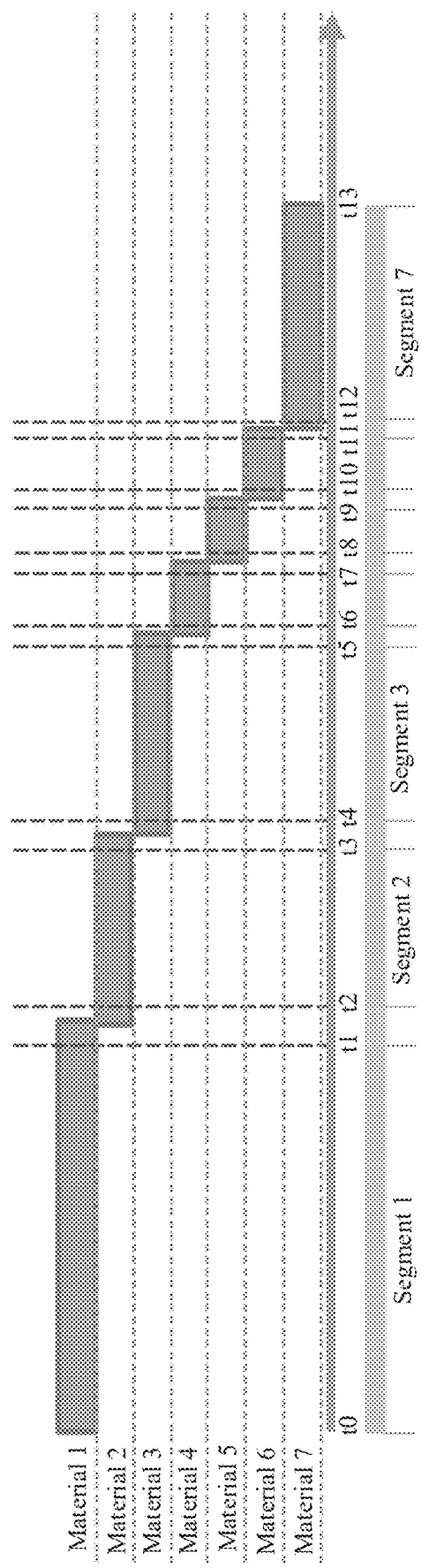
FIG. 6 is a schematic diagram of a video template segment in a video synthesis method according to an embodiment of the present invention.

FIG. 6 is a schematic diagram of segment composition of a video template in a video synthesis method according to an embodiment of the present invention.

One video template usually includes one or more segments and transitions. As shown in FIG. 6, the video template includes a segment 1, a transition 1, a segment 2, a transition 2, a segment 3, a transition 3, a segment 4, a transition 4, a segment 5, a transition 5, a segment 6, a transition 6, and a segment 7. The transition is a transition part between segments.

FIG. 7 is a schematic diagram of configuration information of a video template in a video synthesis method according to an embodiment of the present invention.

It can be learned from FIG. 7 that configuration information of a video template usually includes one or more of duration information of each segment in the video template, an effect parameter (for example, a special effect parameter or a filter parameter) corresponding to at least one segment, scenario matching information of each segment, and a default background music parameter. Each segment in the video template is an integer multiple of a beat speed of default background music of the video template, to implement synchronization between a music beat and a video segment in each segment. The scenario matching information may include type information, size information, or the like of a scenario to which a segment is suitable.

In this embodiment of the present invention, the user may select the default background music corresponding to the video template as background music of a to-be-synthesized video, or may additionally specify background music as background music of a to-be-synthesized video.

In the first case, to implement synchronization between a music beat and a video segment, the electronic device does not need to adjust duration of each segment in the video template. In the second case, to implement synchronization between a music beat and a video segment, the electronic device needs to perform beat detection on the background music specified by the user to obtain a beat speed of the background music specified by the user, then determines whether duration of each segment in the video template is equal to an integer multiple of the obtained beat speed, and adjusts duration of a segment whose duration is not equal to an integer multiple of the obtained beat speed, so that the duration of each segment in the video template is an integer multiple of the beat speed.

In specific implementation, in this embodiment of the present invention, a BPM (Beat Per Minute, beat per minute) detection method is used to perform beat detection on the background music, to obtain a beat speed b (bpm). The electronic device analyzes audio by using a digital signal processing (DSP, Digital Signal Processing) method to obtain a music beat point. In a usual algorithm, original audio is divided into several segments, then a spectrum is obtained through fast Fourier transform, and finally filtering analysis is performed based on sound energy to obtain a final beat point.

Figure 8:
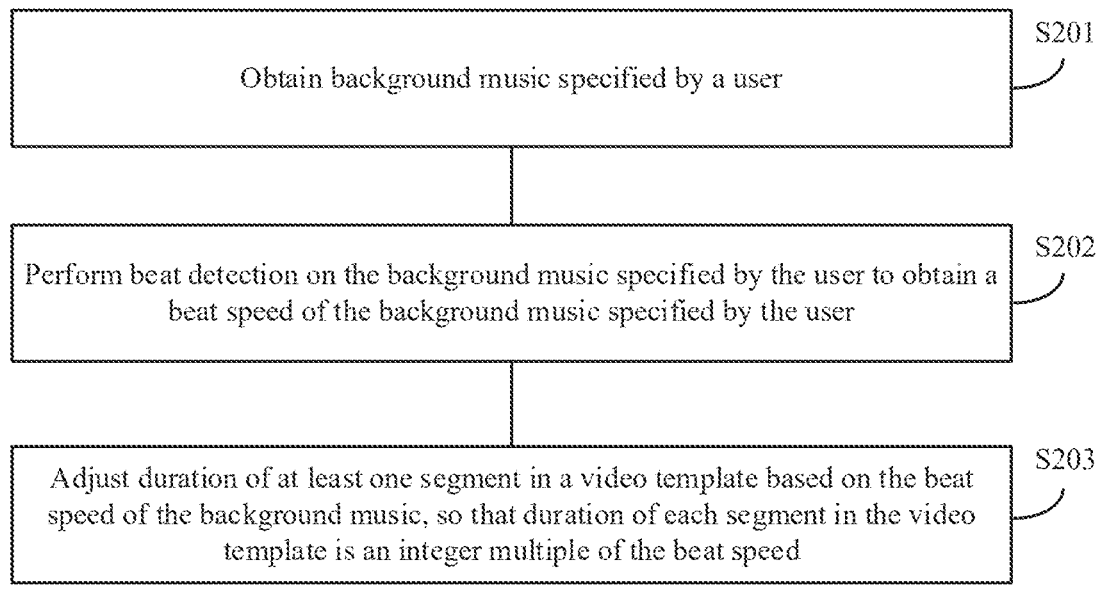
FIG. 8 is another flowchart of a video synthesis method according to an embodiment of this application.

Based on the foregoing descriptions, as shown in FIG. 8, in this embodiment of the present invention, the video synthesis method further includes the following steps:

Step S201: Obtain background music specified by a user.

Step S202: Perform beat detection on the background music specified by the user to obtain a beat speed of the background music specified by the user.

Step S203: Adjust duration of at least one segment in a video template based on the beat speed of the background music, so that duration of each segment in the video template is an integer multiple of the beat speed.

Step S201 may be performed simultaneously with step S101, or may be performed before or after step S101. Similarly, step S202 and step S203 may also be performed before or after step S102, or may be performed simultaneously with step S102. This is not specifically limited in the present invention.

It may be understood that, in this embodiment of the present invention, beat detection is performed on the specified background music, to obtain the beat speed of the specified background music, and the duration of each segment in the video template is adjusted based on the beat speed of the specified background music, so that the duration of each segment in the video template is an integer multiple of the beat speed, and when the user changes the background music of the video template, synchronization between music and a video segment can be implemented.

Step S102: Perform scenario analysis on the materials specified by the user, to obtain scenario characteristic information of each of the materials, where a type of the material specified by the user includes a picture material and/or a video material.

In this embodiment of the present invention, in an example, performing scenario analysis on the materials specified by the user may be specifically performing saliency detection on the materials specified by the user.

Usually, when facing a scenario, human eyes automatically focus on some regions of interest, and selectively ignore regions of no interest. These regions of interest are referred to as salient regions. In the field of computer vision, simulation of this characteristic through an image processing method is called the saliency detection.

Currently, implementation of the saliency detection is mainly divided into two categories: one is through the conventional image processing method, and the other is through deep learning. A result of the saliency detection is usually a grayscale image. A higher grayscale value indicates higher saliency of a region.

A video material is formed by consecutive frames, a frame is an image, and a picture material is formed by an image. Performing the saliency detection on the materials specified by the user is specifically performing saliency detection on each image of each material, to obtain two detection results: There is a subject and there is no subject. When there is a subject, the electronic device determines a location and a size of the subject in the image, to obtain a main frame, and then calculates a ratio R=M/S of an area M of the main frame to an area S of the image. When R is greater than a first threshold k1, it is determined that the image is of a small scenario type, when R is less than a second threshold k2, it is determined that the image is of a large scenario type, and when R is less than or equal to k1 and greater than or equal to k2, it is determined that the image is of a common scenario type. When there is no subject, the electronic device determines that the image is of the large scenario type.

Step S103: Determine a video synthesis policy of the user based on the video synthesis policy selection information, and if the video synthesis policy is a fixed-length synthesis policy, perform scenario matching on each material and each segment in the video template based on the scenario characteristic information of each of the materials and the scenario matching information of each segment in the video template, and select content obtained through scenario matching in each material and fill the content in a corresponding segment in the video template, to synthesize a video.

Figure 9:
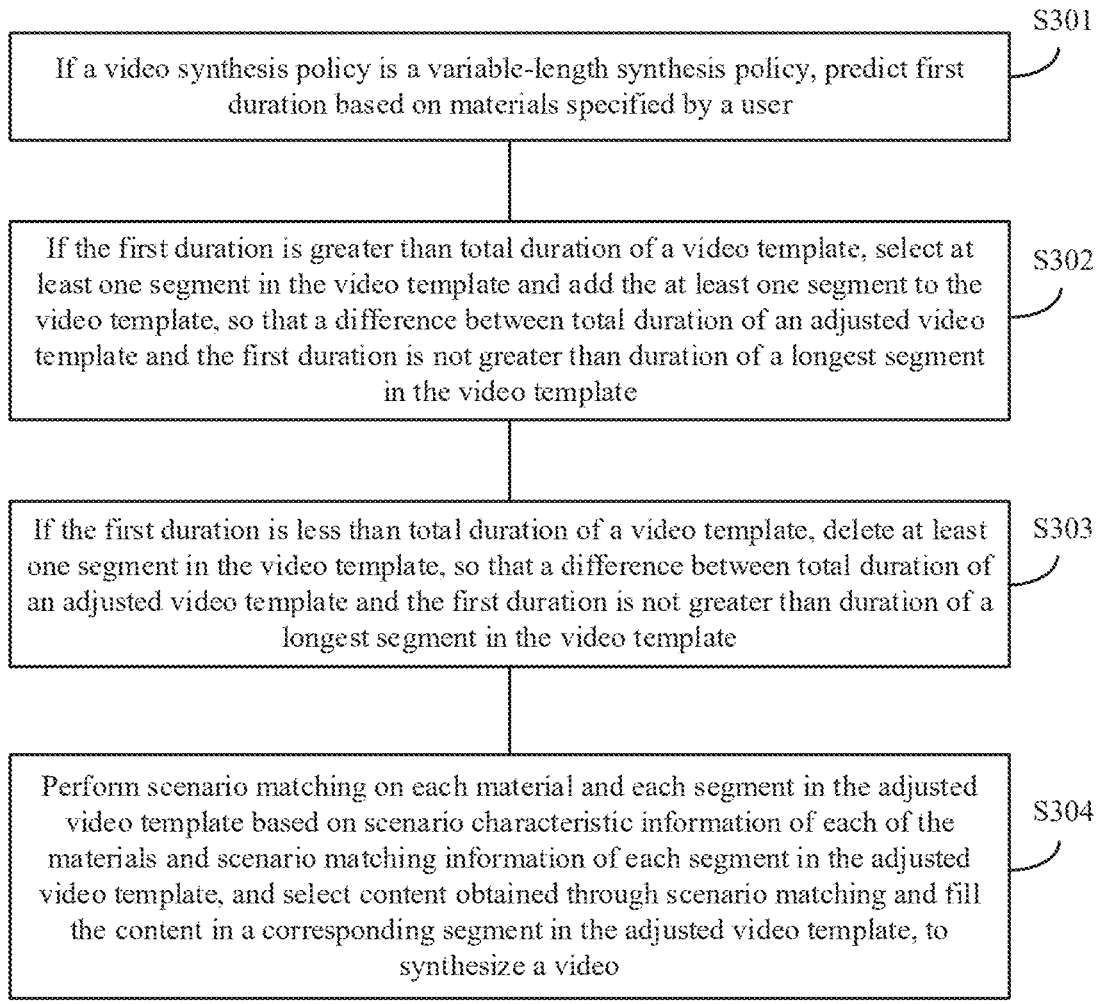
FIG. 9 is another flowchart of a video synthesis method according to an embodiment of this application.

Refer to FIG. 9. In this embodiment of the present invention, the video synthesis method further includes the following steps.

Step S301: If the video synthesis policy is a variable-length synthesis policy, predict first duration L based on the materials specified by the user.

The first duration L is associated with types and a quantity of materials specified by the user. Specifically, if the type of the material specified by the user includes both the video material and the picture material, the first duration L is a sum of total prediction duration T1 of the video material and total prediction duration T2 of the picture material. If the type of the materials specified by the user includes only the video material, the first duration L is equal to the total prediction duration T1 of the material. If the type of the materials specified by the user includes only the picture material, the first duration L is equal to the total prediction duration T2 of the picture material.

The total prediction duration T1 of the video material is equal to a sum of prediction duration of all video materials. Prediction duration of a single video material is associated with duration of the video material. In one or more embodiments of the present invention, longer duration of the video material indicates longer prediction duration corresponding to the video material. The duration of the video material is original duration of the video material or duration adjusted in step S203.

The total prediction duration T2 of the picture material is associated with a quantity of picture materials included in the materials specified by the user. In one or more embodiments of the present invention, a larger quantity of picture materials indicates longer total prediction duration T2 of the picture material.

For example, a formula corresponding to calculating the prediction duration of the single video material may be as follows:

$$f(t) = \begin{cases} t, & t \leq 10 \text{ s} \\ 10 \text{ s} & 10 \text{ s} < t \leq 60 \text{ s} \\ 20 \text{ s}, & 60 \text{ s} < t \leq 90 \text{ s} \\ 30 \text{ s}, & 90 \text{ s} < t \leq 120 \text{ s} \\ 45 \text{ s}, & t > 120 \text{ s} \end{cases}$$

f(t) represents the prediction duration of the single video material, and t represents the duration of the video material.

For example, a formula corresponding to calculating the total prediction duration T2 of the picture material may be as follows:

$$f(n) = \begin{cases} 4 \text{ s}, & n = 1 \\ 7 \text{ s}, & 2 \leq n \leq 6 \\ n\text{s}, & n > 6 \end{cases}$$

f(t) represents the total prediction duration T2 of the picture material, and II represents the quantity of picture materials.

Based on the foregoing descriptions, a formula corresponding to calculating the first duration L may be as follows:

$$L = \sum_{N_v} f(t) + f(n)$$

v represents a quantity of video materials.

Step S302: If the first duration is greater than total duration of the video template, select at least one segment in the video template and add the at least one segment to the video template, so that a difference between total duration of an adjusted video template and the first duration is not greater than duration of a longest segment in the video template.

Specifically, an example in which the video template includes a segment 1, a segment 2, and a segment 3 is used for description. If the first duration is greater than the total duration of the video template, one or more of the segment 1, the segment 2, and the segment 3 may be repeatedly added after the video template, so that the difference between the total duration of the adjusted video template and the first duration is not greater than the duration of the longest segment in the video template, and the total duration of the adjusted video template can be as close to the first duration as possible. In addition, it is ensured that a transition time point of each segment in the adjusted video template can match the beat speed of the background music, that is, synchronization between the transition time point of each segment in the video template and the background music can be implemented.

Preferably, in this embodiment of the present invention, selecting the at least one segment in the video template and adding the at least one segment to the video template, so that the difference between the total duration of the adjusted video template and the first duration is not greater than the duration of the longest segment in the video template may also be: selecting the at least one segment in the video template and adding the at least one segment to the video template, so that the difference between the total duration of the adjusted video template and the first duration is not greater than duration of any segment in the video template, to minimize the difference between the total duration of the adjusted video template and the first duration while ensuring that a transition time point of each segment in the video template can match the beat speed of the background music.

Step S303: If the first duration is less than total duration of the video template, delete at least one segment in the video template, so that a difference between total duration of an adjusted video template and the first duration is not greater than duration of a longest segment in the video template.

Specifically, an example in which the video template includes a segment 1, a segment 2, and a segment 3 is used for description. If the first duration is greater than the total duration of the video template, one or more of the segment 1, the segment 2, and the segment 3 in the video template may be deleted, so that the difference between the total duration of the adjusted video template and the first duration is not greater than the duration of the longest segment in the video template, and the total duration of the adjusted video template can be as close to the first duration as possible. In addition, it is ensured that a transition time point of each segment in the adjusted video template can match the beat speed of the background music, that is, synchronization between the transition time point of each segment in the video template and the background music can be implemented.

Preferably, in this embodiment of the present invention, deleting the at least one segment in the video template, so that the difference between the total duration of the adjusted video template and the first duration is not greater than the duration of the longest segment in the video template may also be: deleting the at least one segment in the video template, so that the difference between the total duration of the adjusted video template and the first duration is not greater than duration of any segment in the video template, to minimize the difference between the total duration of the adjusted video template and the first duration while ensuring that a transition time point of each segment in the video template can match the beat speed of the background music.

Step S304: Perform scenario matching on each material and each segment in the adjusted video template based on the scenario characteristic information of each of the materials and scenario matching information of each segment in the adjusted video template, and select content obtained through scenario matching in each material and fill the content in a corresponding segment in the adjusted video template, to synthesize a video.

In specific implementation, step S103 or step S304 of performing scenario matching on each material and each segment in the adjusted video template based on the scenario characteristic information of each of the materials and scenario matching information of each segment in the adjusted video template, and selecting content obtained through scenario matching in each material and filling the content in a corresponding segment in the adjusted video template, to synthesize a video may include the following processes.

Process 1: Perform material classification and video template segment splitting.

Figure 10:
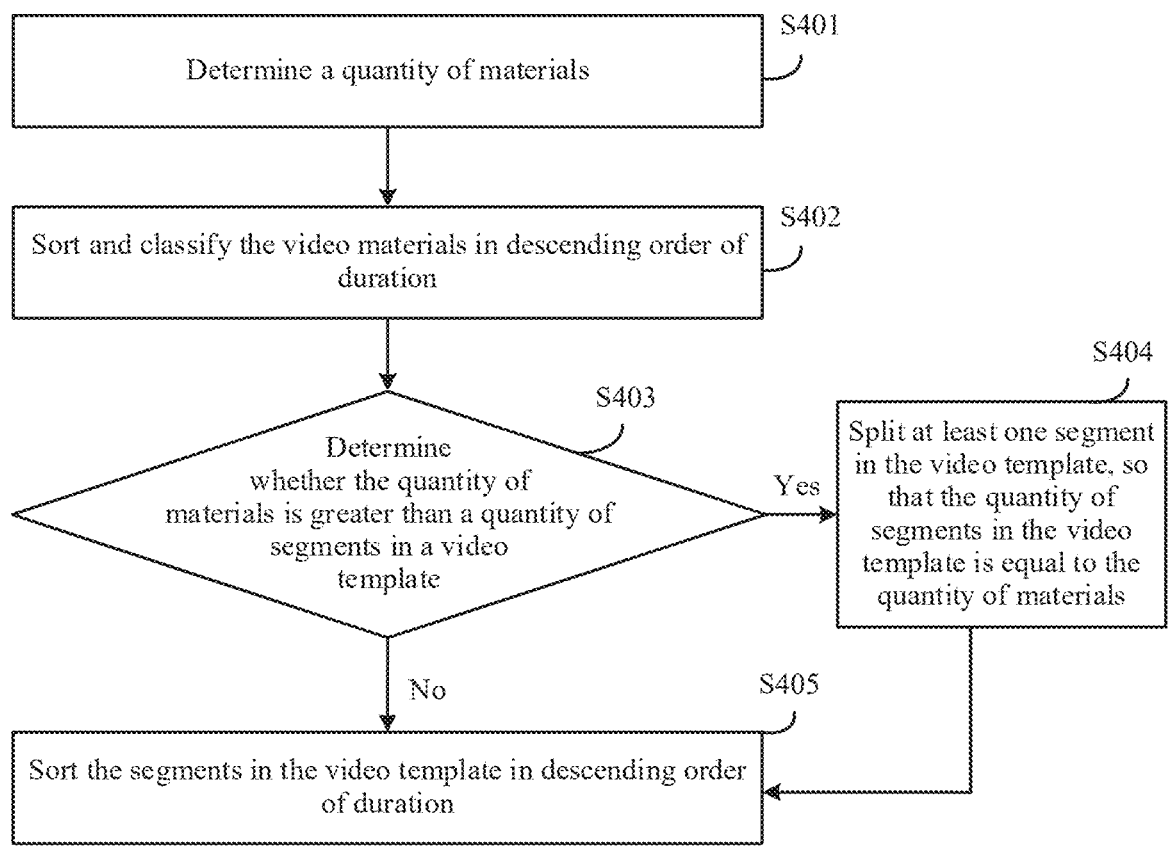
FIG. 10 is another flowchart of a video synthesis method according to an embodiment of this application.

As shown in FIG. 10, the material classification and template segment splitting process may include the following steps.

Step S401: Determine a quantity of materials, where the quantity of materials is a sum of a quantity of picture materials and a quantity of video materials.

Step S402: Sort and classify the video materials in descending order of duration.

In an example, the video materials are classified based on the following rules.

A material whose duration is greater than or equal to the longest segment in the video template is used as a first video material group.

A material whose duration is less than the longest segment in the video template and greater than or equal to a second longest segment in the video template is used as a second video material group.

By analogy, each video material is grouped into a corresponding video material group.

Step S403: Determine whether the quantity of materials is greater than a quantity of segments in the video template; and perform step S404 if the quantity of materials is greater than the quantity of segments in the video template, or perform step S405 if the quantity of materials is not greater than the quantity of segments in the video template.

Step S404: Split at least one segment in the video template, so that the quantity of segments in the video template is equal to the quantity of materials.

In this embodiment of the present invention, if the material specified by the user includes only the picture material or the video material, the electronic device starts splitting from a segment with longest duration in the video template until the quantity of segments in the video template is equal to the quantity of materials.

Figure 11:
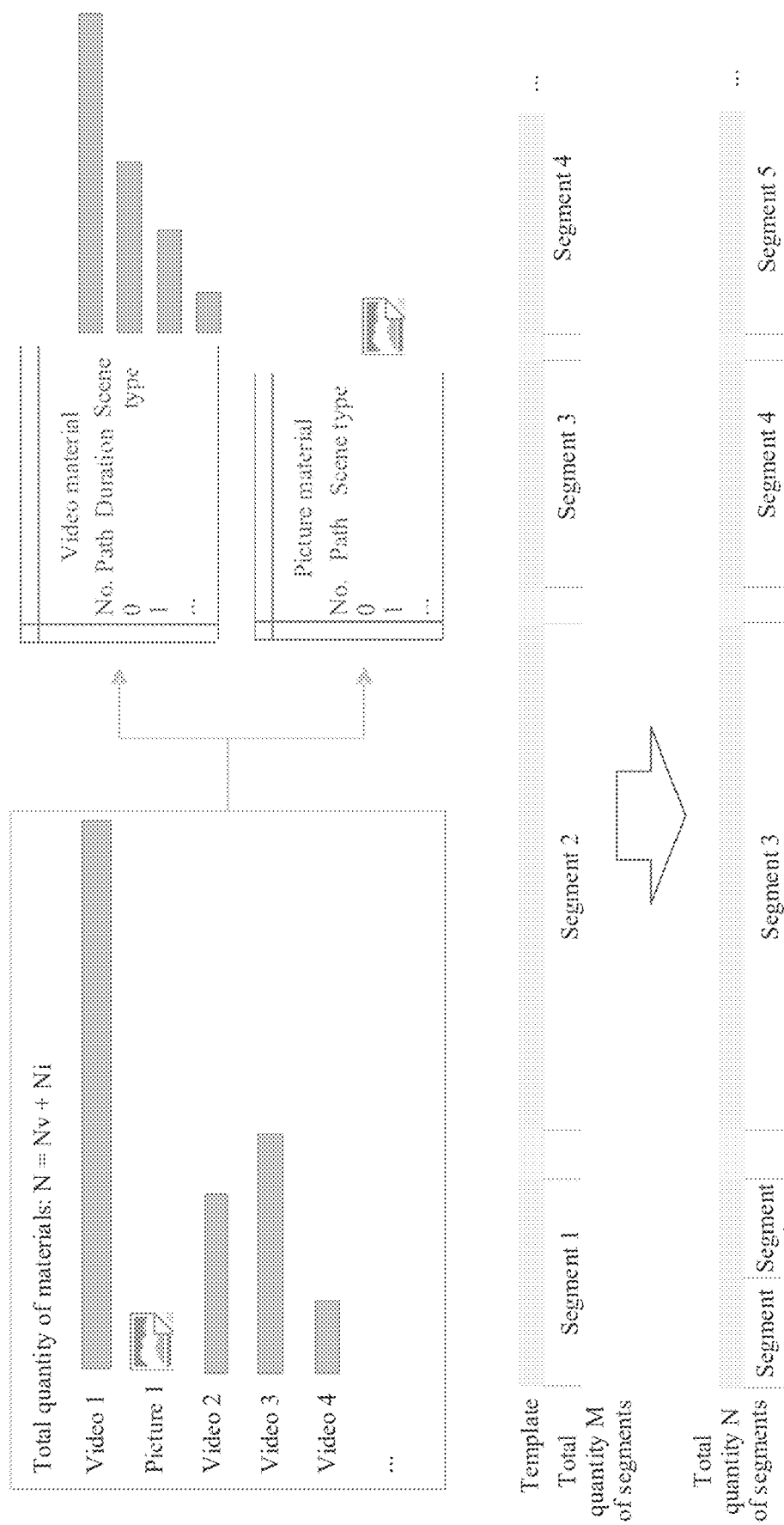
FIG. 11 is a schematic diagram of segment clipping in a video synthesis method according to an embodiment of this application.

In this embodiment of the present invention, if the material specified by the user includes both the picture material and the video material, the electronic device starts splitting from a segment with shortest duration in the video template until the quantity of segments in the video template is equal to the quantity of materials. For example, as shown in FIG. 11, a segment 1 with shortest duration is split into a segment 2 and a segment 3.

In this embodiment of the present invention, an original segment may be split into one or more segments. However, it should be noted that duration of a segment obtained through splitting needs to be an integer multiple of the beat speed, to implement synchronization between the segment and a music beat.

Step S405: Sort the segments in the video template in descending order of duration.

Process 2: Perform video material matching.

Figure 12:
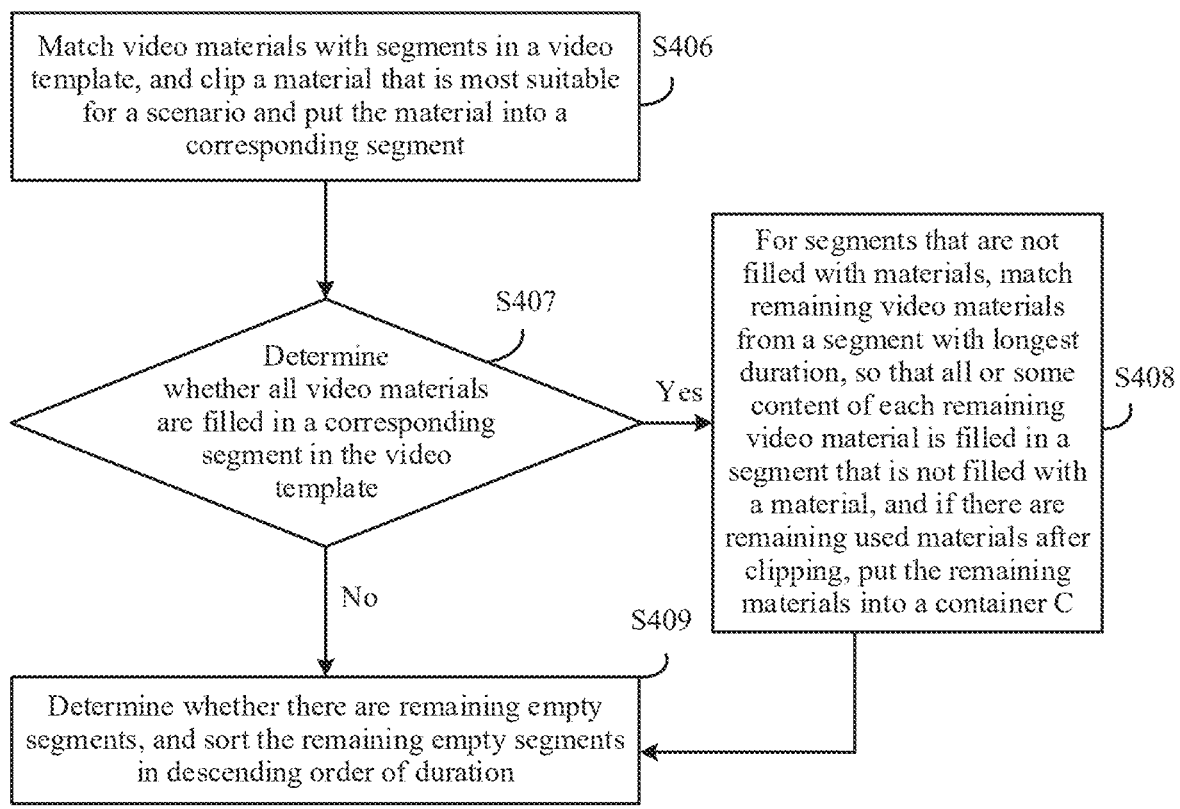
FIG. 12 is another flowchart of a video synthesis method according to an embodiment of this application.

As shown in FIG. 12, the video material matching process may include the following steps.

Step S406: Match the video materials with the segments in the video template, and clip a material that is most suitable for a scenario and put the material into a corresponding segment. In this embodiment of the present invention, scenario characteristic information of the video materials and scenario matching information of the segments are used to determine a matching degree between the video materials and the video template segments.

Figure 13:
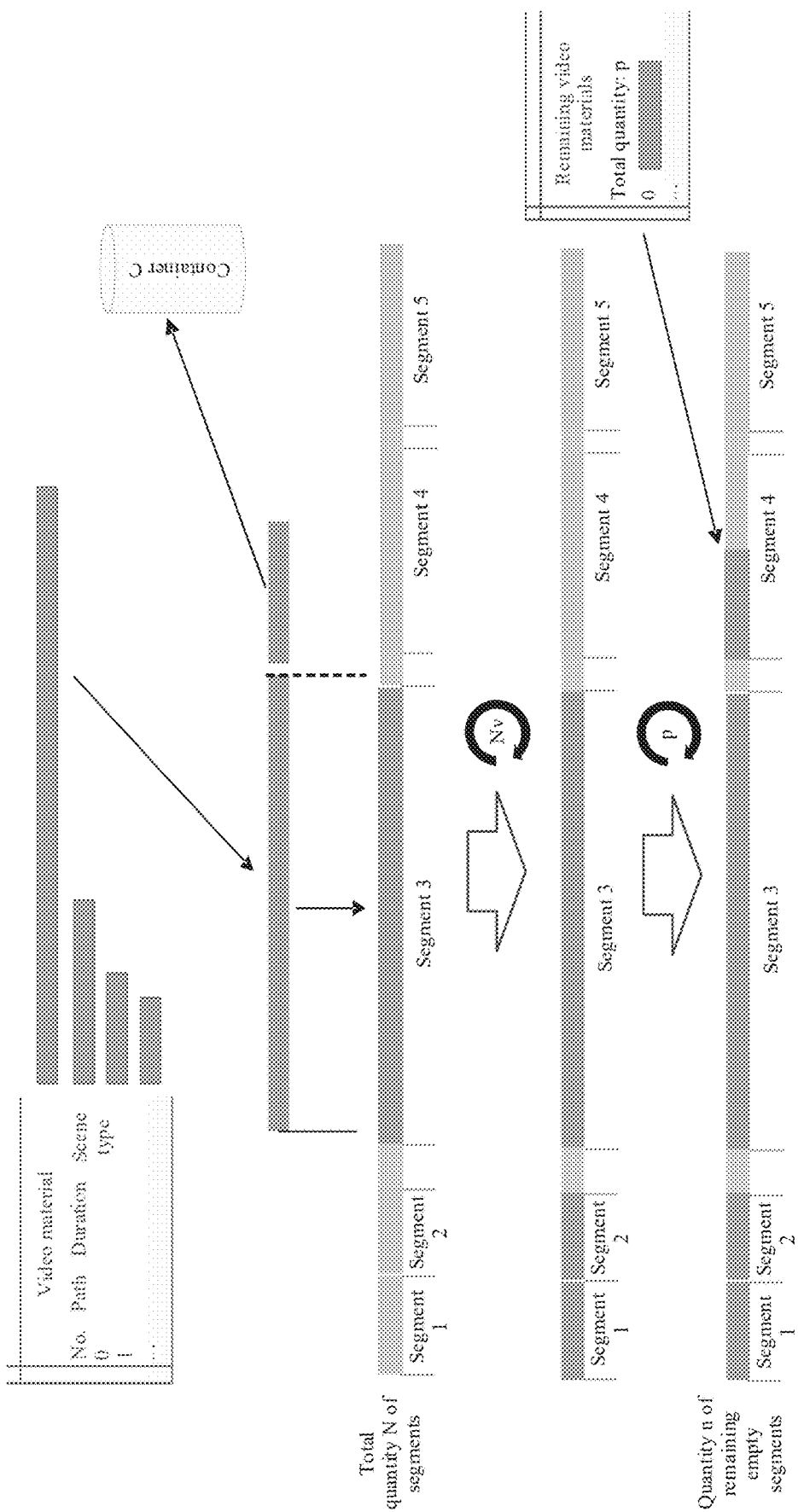
FIG. 13 is a schematic diagram of material matching in a video synthesis method according to an embodiment of this application.

In this embodiment of the present invention, the video material group is selected in descending order of duration starting from a segment with longest duration to perform the scenario matching. As shown in FIG. 13, a segment (segment 3) with longest duration is first matched with materials in the first video material group, to determine whether the first video material group includes a material that matches the longest segment (segment 3). If the first video material group includes the material that matches the longest segment (segment 3), all or some content of the material that is most suitable for a scenario and that is in the first video material is filled in the longest segment (segment 3). If the first video material group does not include the material that matches the longest segment (segment 3), all or some content of a material whose shooting time is the earliest is selected and filled in the longest segment (segment 3). In another implementation, if no suitable material is matched with the longest segment (segment 3), all or some content of a material with longest duration in the first video material group may also be filled in the longest segment (segment 3) or all or some content of a video material in the first video material group is randomly selected and filled in the longest segment (segment 3). If there are remaining used video materials after clipping, the remaining materials are put into a container C.

After the longest segment (segment 3) in the video template is matched with the materials in the first video material group, the second longest segment is matched with materials in the second video material group. A matching rule is the same as a rule of matching between the longest segment and the first video material group. Details are not described herein again.

Step S407: Determine whether all video materials are filled in a corresponding segment in the video template; and perform step S408 if not all video materials are filled in the corresponding segment in the video template, or perform step S409 if all the video materials are filled in the corresponding segment in the video template.

Step S408: For segments that are not filled with materials, match remaining video materials from a segment with longest duration, so that all or some content of each remaining video material is filled in a segment that is not filled with a material, and if there are remaining used materials after clipping, put the remaining materials into the container C.

Step S409: Determine whether there are remaining empty segments, and sort the remaining empty segments in descending order of duration.

In steps S401 to S409, some steps are unnecessary. For example, step S409 may be unnecessary.

Process 3: Perform picture material matching.

Figure 14:
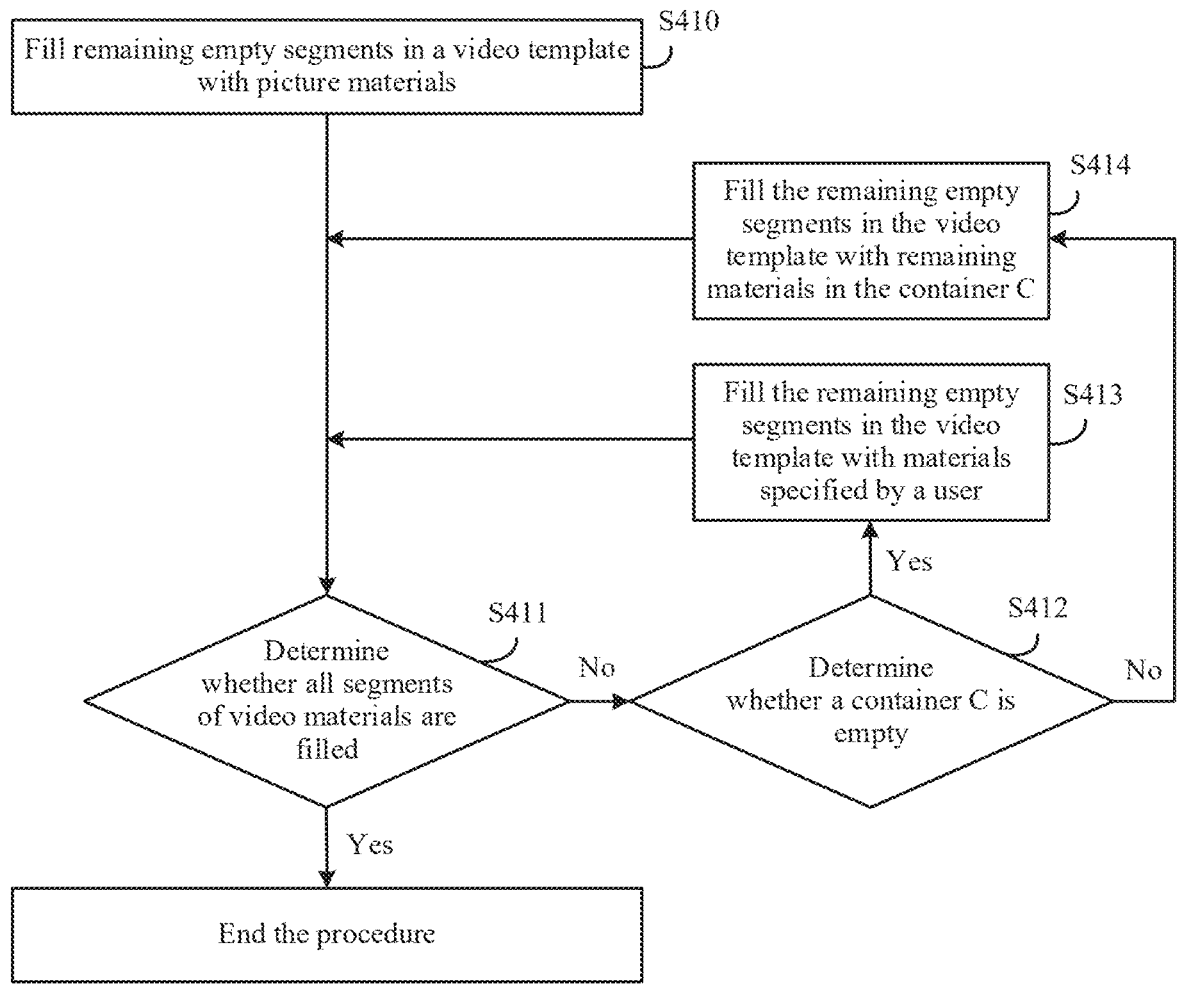
FIG. 14 is another flowchart of a video synthesis method according to an embodiment of this application.

As shown in FIG. 14, the picture material matching process may include the following steps.

Step S410: Fill remaining empty segments in a video template with picture materials, where optionally, in an embodiment of the present invention, fill the picture materials from a longest remaining empty segment based on an order of the remaining empty segments.

Step S411: Determine whether all segments of the video materials are filled; and end the procedure if all the segments of the video materials are filled, or perform step S412 if not all segments of the video materials are filled.

Step S412: Determine whether the container C is empty; and perform step S413 if the container C is empty, or perform step S414 if the container C is not empty.

Step S413: Fill the remaining empty segments in the video template with the materials specified by the user, and then return to step S411.

In an optional embodiment of the present invention, when the materials specified by the user include both the video materials and the picture materials, the video materials are preferentially used to fill the remaining empty segments in the video template, and if the video materials have all been used once, the picture materials are then used to fill the remaining empty segments in the video template.

Step S414: Fill the remaining empty segments in the video template with the remaining materials in the container C, and then return to step S411.

In an optional embodiment of the present invention, the electronic device preferentially selects a segment with long duration from the remaining empty segments to match the remaining materials, and preferentially selects a remaining material with long duration for matching when matching the remaining materials.

In an implementation of the present invention, after the segments in the video template are filled with the specified materials, the video synthesis method further includes the following steps:

Step S501: Generate a video synthesis parameter based on a filling result, where the video synthesis parameter includes a play sequence parameter of selected material content, a play time parameter of the selected material content, an effect parameter (for example, a special effect parameter or a filter parameter), and the like, and the effect parameter may be determined based on configuration information of a video template.

Step S502: Sequentially perform decoding processing and rendering processing on the selected material content based on the video synthesis parameter, to synthesize a video.

Performing decoding processing on the selected material content is specifically performing standardization processing on the selected material content, so that each piece of material content is converted into a predetermined format, where the predetermined format includes an image coding format, an image coding frame rate, and an image size. After the decoding processing is performed, the selected material content is rendered based on the effect parameter in the video synthesis parameter, to synthesize the video.

The decoding processing may be completed by a video codec (Video Codec), and the video codec (Video Codec) is a program or a device that can compress or decompress a digital video. Usually, this type of compression is lossy data compression. A video is a continuous image sequence formed by consecutive frames. A frame is an image. Due to persistence of vision effect of human eyes, when the frame sequence is played at a specific rate, a video with continuous actions is seen. Because the consecutive frames are highly similar, to facilitate storage and transmission, an original video needs to be coded and compressed to remove redundancy in spatial and temporal dimensions. Common video codecs include H.26X series (such as H.263 and H.264) and MPEG (Moving Picture Experts Group, moving picture experts group) series (MPEG-1 VCD (Video Compact Disc, video compact disc), MPEG-2 DVD (Digital Video Disc, high-density digital video disc), MPEG-4 AVC (Advanced Video Codec, advanced video codec), and the like).

The rendering processing may be performed by an OpenGL (Open Graphics Library, open graphics library/open graphics library) that is a cross-language and cross-platform application programming interface (API, Application Programming Interface) for rendering 2D and 3D vector graphics. During the video rendering, GLSL-OpenGL Shading Language (a high-level coloring language based on C language) may be used to implement various special effects and filter effects.

Figure 15:
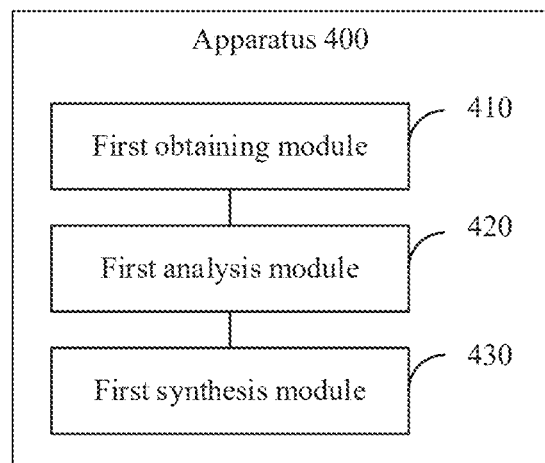
FIG. 15 is a schematic diagram of a structure of a video synthesis apparatus according to an embodiment of this application.

An embodiment of this application further discloses a video synthesis apparatus. It should be understood that an apparatus 400 can perform the steps in the video synthesis method. To avoid repetition, details are not described herein again. As shown in FIG. 15, the apparatus 400 includes a first obtaining module 410, a first analysis module 420, and a first synthesis module 430.

The first obtaining module 410 is configured to obtain materials specified by a user, video synthesis policy selection information, a video template, and configuration information of the video template, where a type of the material specified by the user includes a picture material and/or a video material, the video template includes at least one segment, and the configuration information of the video template includes scenario matching information of each of the at least one segment.

The first analysis module 420 is configured to perform scenario analysis on the materials specified by the user, to obtain scenario characteristic information of each of the materials.

The first synthesis module 430 is configured to: determine a video synthesis policy of the user based on the video synthesis policy selection information, and if the video synthesis policy is a fixed-length synthesis policy, perform scenario matching on each material and each segment in the video template based on the scenario characteristic information of each of the materials and the scenario matching information of each segment in the video template, and select content obtained through scenario matching in each material and fill the content in a corresponding segment in the video template, to synthesize a video.

In this embodiment, whether a length of a video expected to be synthesized is equal to a length of the video template is determined according to the video synthesis policy selected by the user, so that the user can flexibly select the length of the synthesized video. A moving feeling brought by the video template is ensured by analyzing a scenario of a material to match a suitable segment in the video template.

In an optional embodiment, the apparatus 400 further includes a first prediction module, a first adjustment module, a second adjustment module, and a second synthesis module.

The first prediction module is configured to: if the video synthesis policy is a variable-length synthesis policy, predict first duration based on the materials specified by the user.

The first adjustment module is configured to: if the first duration is greater than total duration of the video template, select at least one segment in the video template and add the at least one segment to the video template, so that a difference between total duration of an adjusted video template and the first duration is not greater than duration of a longest segment in the video template.

The second adjustment module is configured to: if the first duration is less than total duration of the video template, delete at least one segment in the video template, so that a difference between total duration of an adjusted video template and the first duration is not greater than duration of a longest segment in the video template.

The second synthesis module is configured to: perform scenario matching on each material and each segment in the adjusted video template based on the scenario characteristic information of each of the materials and scenario matching information of each segment in the adjusted video template, and select content obtained through scenario matching in each material and fill the content in a corresponding segment in the adjusted video template, to synthesize a video.

In an optional embodiment, the apparatus 400 further includes a second obtaining module, a first detection module, and a third adjustment module.

The second obtaining module is configured to obtain background music specified by the user.

The first detection module is configured to perform beat detection on the background music specified by the user to obtain a beat speed of the background music specified by the user.

The third adjustment module is configured to adjust duration of at least one segment in the video template based on the beat speed of the background music, so that duration of each segment in the video template is an integer multiple of the beat speed.

In an embodiment, the apparatus 400 further includes a first determining module, a first judging module, and a first splitting module.

The first determining module is configured to determine a quantity of materials specified by the user.

The first judging module is configured to determine whether the quantity of materials specified by the user is greater than a quantity of segments in the video template.

The first splitting module is configured to: if the quantity of materials specified by the user is greater than the quantity of segments in the video template, split at least one segment in the video template, so that the quantity of segments in the video template is equal to the quantity of materials specified by the user.

It may be understood that the video synthesis solution provided in this embodiment of this application is used to perform, based on the video template specified by the user, video synthesis on the materials selected by the user. In a synthesis process, the user does not need to perform manual editing, and the video template of the user may be dynamically adjusted, to implement synchronization between a music beat and a video segment and flexibly set a video length. Compared with the conventional technology, in the video synthesis method provided in this embodiment of this application, manual editing does not need to be performed, and video synthesis flexibility can be considered while it is ensured that the video template is used.

This application further provides an electronic device. As shown in FIG. 1, the electronic device 100 includes a memory 121 and a processor 110. The memory 121 stores a computer program, the processor 110 is connected to the memory 121, and the processor 110 executes the computer program to implement the foregoing video synthesis method.

This application further provides a computer storage medium, including computer instructions. When the computer instructions are run on an electronic device, the electronic device is enabled to perform the steps in the foregoing video synthesis method.

This application further provides a computer program product. When the computer program product runs on a computer, the computer is enabled to perform the steps in the foregoing video synthesis method.

A person skilled in the art may clearly understand that, for the purpose of convenient and brief description, for a detailed working process of the foregoing system, apparatus, and unit, refer to a corresponding process in the foregoing method embodiments. Details are not described herein again.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A method, comprising:
    obtaining materials from a user, video synthesis policy selection information, a video template, and configuration information of the video template, wherein the materials comprise picture material or video material, wherein the video template comprises at least one segment, and wherein the configuration information comprises scenario matching information of each segment;
    performing scenario analysis on the materials to obtain scenario characteristic information of each material;
    identifying, based on the video synthesis policy selection information and from a plurality of video synthesis policies, a video synthesis policy of the user, wherein the plurality of video synthesis policies comprises a fixed-length synthesis policy and a variable-length synthesis policy; and
    when the video synthesis policy is the fixed-length synthesis policy:
        splitting a first segment in the at least one segment in the video template such that a second quantity of segments in the video template is equal to a first quantity of materials when the first quantity is greater than the second quantity;
        performing, based on the scenario characteristic information of each material and the scenario matching information of each segment, scenario matching between each material and each segment;
        selecting, based on the scenario matching, first content in each material; and
        filling the first content in a first corresponding segment in the video template to synthesize a first video.

2. The method of claim 1, further comprising:
    when the video synthesis policy is the variable-length synthesis policy, predicting, based on the materials, a first duration;
    when the first duration is greater than a total duration of the video template:
        selecting a second segment from the at least one segment in the video template; and
        adding the second segment to the video template to produce an adjusted video template having a second duration, wherein a first difference between the second duration and the first duration is not greater than a third duration of a longest segment in the video template;
    when the first duration is less than the total duration, deleting a third segment from the at least one segment in the video template to produce the adjusted video template having a fourth duration, wherein a second difference between the fourth duration and the first duration is not greater than the third duration;
    performing, based on the scenario characteristic information of each material and the scenario matching information of each segment, scenario matching between each material and each segment;
    selecting, based on the scenario matching, second content in each material; and
    filling the second content in a second corresponding segment in the adjusted video template to synthesize a second video.

3. The method of claim 1, further comprising:
    obtaining background music from the user;
    performing beat detection on the background music to obtain a beat speed of the background music; and
    adjusting, based on the beat speed, a first duration of a second first segment of the at least one segment in the video template such that a total duration of all segments in the video template is an integer multiple of the beat speed,
    wherein identifying the video synthesis policy of the user is performed after adjusting, based on the beat speed, the first duration of the second first segment.

4. The method of claim 1, wherein the materials comprise a Moving Picture Experts Group (MPEG) format.

5. The method of claim 1, wherein the materials comprise an H.264 format.

6. The method of claim 1, wherein the materials comprise a JPG format.

7. An electronic device, comprising:
a memory configured to store instructions; and
one or more processors coupled to the memory and configured to execute the instructions to:
obtain materials from a user, video synthesis policy selection information, a video template, and configuration information of the video template, wherein the materials comprise picture material or video material, wherein the video template comprises at least one segment, and wherein the configuration information comprises scenario matching information of each segment;
perform scenario analysis on the materials to obtain scenario characteristic information of each material;
identify, based on the video synthesis policy selection information and from a plurality of video synthesis policies, a video synthesis policy of the user, wherein the plurality of video synthesis policies comprises a fixed-length synthesis policy and a variable-length synthesis policy; and
when the video synthesis policy is the fixed-length synthesis policy:
split a first segment in the at least one segment in the video template such that a second quantity of segments in the video template is equal to a first quantity of materials when the first quantity is greater than the second quantity;
perform, based on the scenario characteristic information of each material and the scenario matching information of each segment, scenario matching between each material and each segment;
select, based on the scenario matching, first content in each material; and
fill the first content in a first corresponding segment in the video template to synthesize a first video.

8. The electronic device of claim 7, wherein the one or more processors are further configured to execute the instructions to:
when the video synthesis policy is the variable-length synthesis policy, predict, based on the materials, a first duration;
when the first duration is greater than a total duration of the video template:
select a second segment from the at least one segment; and
add the second segment to the video template to produce an adjusted video template having a second duration, wherein a first difference between the second duration and the first duration is not greater than a third duration of a longest segment in the video template;
when the first duration is less than the total duration, delete a third segment from the at least one segment in the video template to produce the adjusted video template having a fourth duration, wherein a second difference between the fourth duration and the first duration is not greater than the third duration;
perform, based on the scenario characteristic information of each material and scenario matching information of each segment, scenario matching between each material and each segment;
select, based on the scenario matching, second content obtained in each material; and
fill the second content in a second corresponding segment in the adjusted video template to synthesize a second video.

9. The electronic device of claim 7, wherein the one or more processors are further configured to execute the instructions to:
obtain background music from the user;
perform beat detection on the background music to obtain a beat speed of the background music; and
adjust, based on the beat speed, a first duration of a second first segment of the at least one segment in the video template such that a total duration of all segments in the video template is an integer multiple of the beat speed.

10. A computer program product comprising instructions stored on a non-transitory computer-readable medium that, when executed by one or more processors, cause an electronic device to:
obtain materials from a user, video synthesis policy selection information, a video template, and configuration information of the video template, wherein the materials comprise picture material or video material, wherein the video template comprises at least one segment, and wherein the configuration information comprises scenario matching information of each segment;
perform scenario analysis on the materials to obtain scenario characteristic information of each material;
identify, based on the video synthesis policy selection information and from a plurality of video synthesis policies, a video synthesis policy of the user, wherein the plurality of video synthesis policies comprises a fixed-length synthesis policy and a variable-length synthesis policy; and
when the video synthesis policy is the fixed-length synthesis policy:
split a first segment in the at least one segment in the video template such that a second quantity of segments in the video template is equal to a first quantity of materials when the first quantity is greater than the second quantity;
perform, based on the scenario characteristic information of each material and the scenario matching information of each segment, scenario matching between each material and each segment;
select, based on the scenario matching, first content in each material; and
fill the first content in a first corresponding segment in the video template to synthesize a first video.

11. The computer program product of claim 10, wherein the instructions further cause the electronic device to:
when the video synthesis policy is the variable-length synthesis policy, predict, based on the materials, a first duration;
when the first duration is greater than a total duration of the video template:
select a second segment from the at least one segment; and
add the second segment to the video template to produce an adjusted video template having a second duration, wherein a first difference between the second duration and the first duration is not greater than a third duration of a longest segment in the video template;
when the first duration is less than the total duration, delete a third segment from the at least one segment in the video template to produce the adjusted video template having a fourth duration, wherein a second difference between the fourth duration and the first duration is not greater than the third duration;

perform, based on the scenario characteristic information of each material and scenario matching information of each segment, scenario matching between each material and each segment;

select, based on the scenario matching, second content obtained in each material; and fill the second content in a second corresponding segment in the adjusted video template to synthesize a second video.

12. The computer program product of claim 10, wherein the instructions further cause the electronic device to:

obtain background music from the user;

perform beat detection on the background music to obtain a beat speed of the background music; and adjust, based on the beat speed, a first duration of a second first segment of the at least one segment in the video template such that a total duration of all segments in the video template is an integer multiple of the beat speed.

13. The computer program product of claim 10, wherein the materials comprise a static image format.

14. The computer program product of claim 10, wherein the materials comprise a Moving Picture Experts Group (MPEG) format.

15. The computer program product of claim 10, wherein the materials comprise an H.264 format.

16. The computer program product of claim 10, wherein the materials comprise an MP3 format.

17. The computer program product of claim 10, wherein the materials comprise an Advanced Audio Coding (AAC) format.

18. The computer program product of claim 10, wherein the materials comprise an Adaptive Multi-Rate (AMR) format.

19. The computer program product of claim 10, wherein the materials comprise a JPG format.

20. The computer program product of claim 10, wherein the materials comprise a PNG format.

* * * * *

UNITED STATES PATENT AND TRADEMARK OFFICE
CERTIFICATE OF CORRECTION

PATENT NO. : 12,425,701 B2
APPLICATION NO. : 18/002791
DATED : September 23, 2025
INVENTOR(S) : Da Su and Yundie Zhang It is certified that error appears in the above-identified patent and that said Letters Patent is hereby corrected as shown below:

In the Claims

Claim 9, Column 30, Lines 7-8: "second first segment of the at least one segment" should read "second segment of the at least one segment"

Claim 12, Column 31, Line 15-16: "a first duration of a second first segment of the at least" should read "a first duration of a second segment of the at least"

Signed and Sealed this
Twenty-eighth Day of October, 2025

John A. Squires
*Director of the United States Patent and Trademark Office*